June 26, 1928.  
W. A. BRYANT  
WAVE MOTOR  
Filed Aug. 18, 1927  
1,674,885  
2 Sheets-Sheet 1

Inventor  
W. A. Bryant,  
By Clarence A. O'Brien  
Attorney

June 26, 1928.
W. A. BRYANT
WAVE MOTOR
Filed Aug. 18, 1927
1,674,885
2 Sheets-Sheet 2
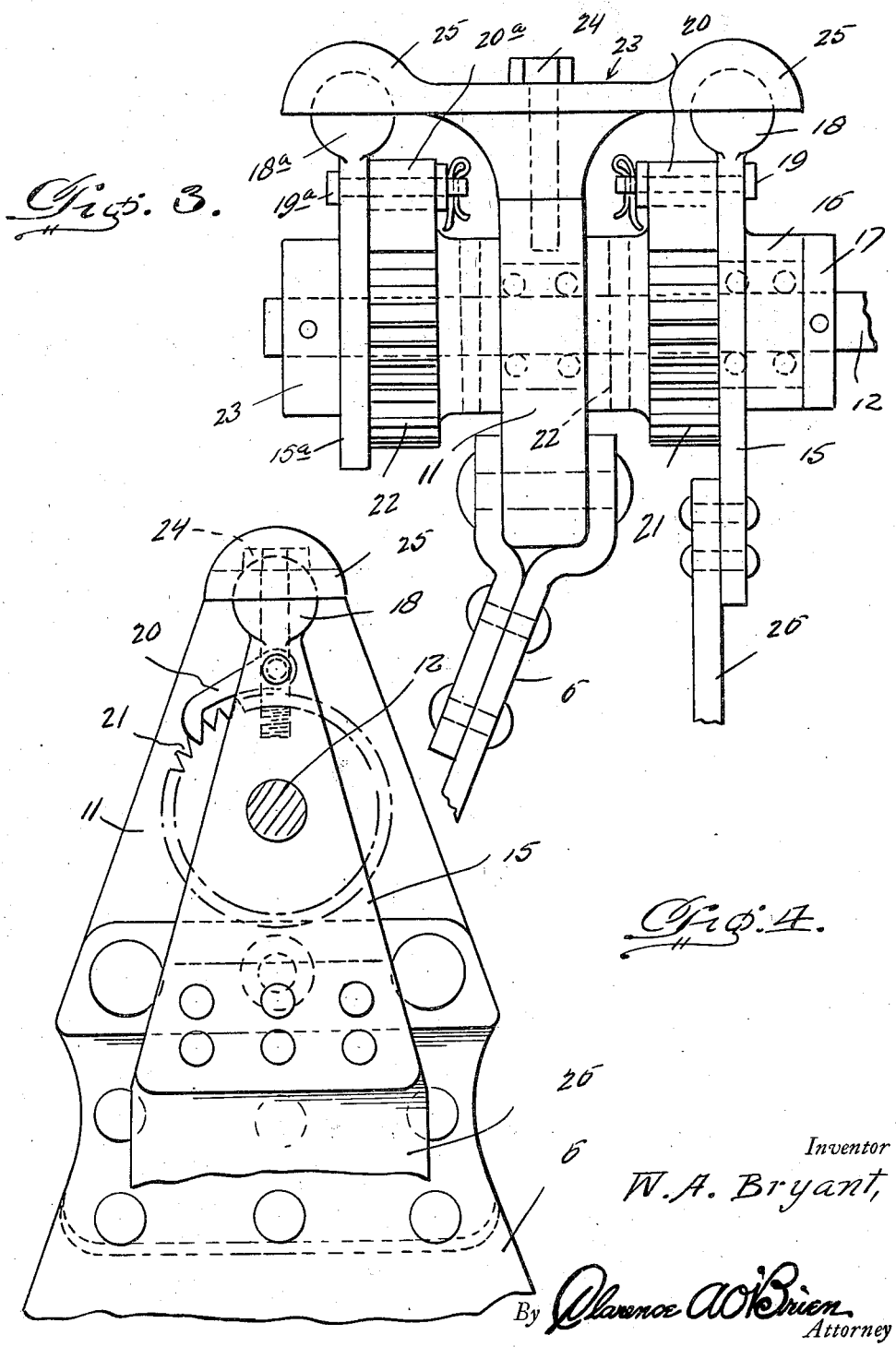

Patented June 26, 1928.

1,674,885

UNITED STATES PATENT OFFICE.

WILLIAM ADAM BRYANT, OF ORLANDO, FLORIDA.

WAVE MOTOR.

Application filed August 18, 1927. Serial No. 213,941.

The present invention relates to what is known in the art as a wave motor, that is a device which is located in a body of water in a manner to permit the motion of the waves to act upon reciprocatory means for transmitting motion to revolving shafts to produce power for operating electric generators and other machinery within the vicinity of the water.

What I propose is a structure which has been very carefully developed to include novel details arranged and associated in a manner for producing a positive and substantially continuous rotation to the power take off shaft, this being accomplished by a pendulous action of wave actuated pontoons which serve to operate a novel pawl and ratchet mechanism for driving the main drive shaft.

In the drawings:—

Figure 3 is an enlarged fragmentary elevational view showing the power transmitting pawl and ratchet mechanism.

Figure 4 is also an enlarged fragmentary view showing an end view of the structure shown in Figure 3, the view being from right to left of Figure 3.

Figure 1:
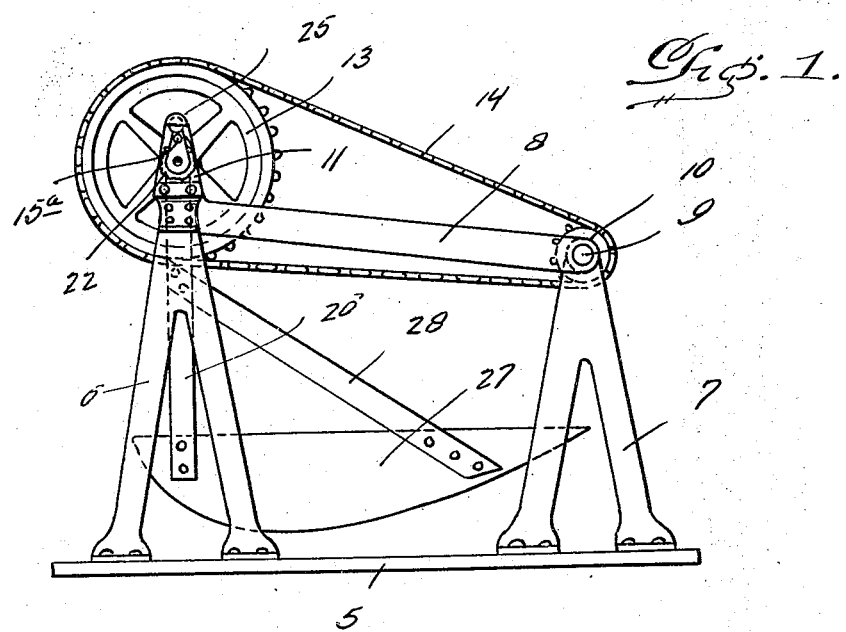
Figure 1 is a side elevation of the complete apparatus.

Referring now to the parts by numerals it will be observed that the reference characters 5 designate a pair of parallel spaced rails of suitable construction which are adapted to be firmly anchored upon suitable piers.

Figure 2:
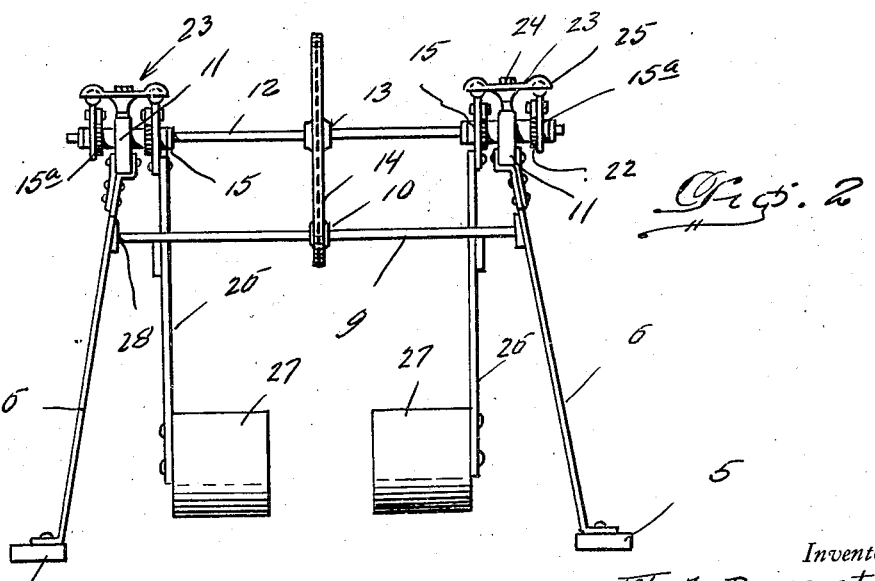
Figure 2 is an end elevation of the same looking in a direction from left to right in Figure 1.

Rising from the end portions of the base rails, we find two pairs of vertically disposed uprights. One pair or set is represented by the reference characters 6, these being comparatively tall and the other pair is represented by the reference characters 7, these being slightly shorter. These uprights are connected together by suitable bracing bars 8. Bearings are formed at the upper ends of the uprights 7 to accommodate a rotary driven or power take off shaft 9 upon which a small sprocket 10 is fastened. The upper ends of the uprights 6 are fashioned as shown in Figures 2 and 3, and secured to main bearings 11 for the rotary drive shaft 12. This drive shaft carries a relatively large sprocket wheel 13 and the sprocket chain 14 is trained over both of the sprocket wheels 10 and 13 for transmitting motion from the shaft 12 to the shaft 9 where it is in turn transmitted to machinery, electric generators, etc.

In order that a clear understanding of the means for transmitting motion to the shaft 12 may be obtained attention is invited to Figure 3. Incidentally this means is duplicated at each end of the shaft and a description of the means at one end will suffice for both. To this end it will be observed that the reference character 15 designates a suitably shaped plate having a bearing 16 mounted for oscillation on the shaft 12. By preference, and to facilitate rotation, ball bearings are included in this bearing structure and a retaining collar 17 is fastened to the shaft and abuts the bearing 16. The upper end of the plate 15 is provided with a ball head 18, and just below this head is a pin or bolt 19 upon which a pawl 20 is pivotally mounted. The pawl is held in place by a cotter key as shown. The pawl cooperates with teeth on a gear 21 which is secured by a pin as at 22 to the shaft 12. These parts are located on one side of the main bearing 11. On the outside of this bearing we find another plate 15$^a$ having a ball head 18$^a$ at its top and carrying a pin 19$^a$ upon which a complemental pawl 20$^a$ is pivotally mounted. The pawl 20$^a$ cooperates with a gear 22 which is also pinned or otherwise rigidly fastened to the shaft 12. Again, a retaining collar 23 is provided for cooperation with the plate 15$^a$. At this time attention is invited to a head plate 23 which is swivelly connected by a bolt 24 to the upper end of the bearing 11, and this plate is provided at its opposite end with sockets 25 receiving the bolt head or joint 18 and 18$^a$, respectively.

Rigidly fastened to the plate 15 is a depending arm 26 which is connected at its lower end to one end of an especially shaped pontoon 27. A brace arm 28 is connected with the depending arm 26 and with the forward end of the same pontoon. It might be stated that the bottom of the pontoon is shaped to be effectively and easily actuated by the incoming tide. Thus, the reduced end of the pontoon is pointed sea-ward.

With the foregoing arrangement it is obvious that the water acting upon the pontoons serves to move them back and forth, in the manner of a pendulum. These pontoons being separately suspended from the drive shaft, serves to transmit motion to the drive shaft through the medium of the pawl and ratchet mechanism. The rotary motion of the shaft 12 is transmitted through the sprocket chain and the sprocket 10 to the power take off shaft 9. The ball joint head plate connection and swivel permits a substantially continuous motion of the shaft 12 to be obtained. Thus upon one stroke of the pontoon in one direction, the gear 21 is actuated while in the reverse stroke the gear 22 is actuated.

It is believed that the construction, operation and efficiency of the structure of this kind will be clear to persons skilled in the art to which the invention relates, therefore, a more lengthy description is believed unnecessary.

Although the invention has been particularly detailed in the drawings, and specifically described in the description, it is to be understood that minor changes in shape, size, and rearrangement of parts may be resorted to if desired.

Having thus described the invention, what I claim as new is:—

1. In a structure of the class described, a pair of spaced parallel base members, pairs of uprights fastened to and rising from said base members and provided at their upper ends with bearings, horizontal shafts mounted for rotation in said bearings, sprockets carried by said shafts, a sprocket chain trained over said sprockets, connecting bars between the upper ends of said uprights, a pair of oppositely located pontoons disposed between a complemental pair of the uprights, suspension arms for said pontoons rockably mounted on one of the shafts, and individual sets of pawl and ratchet driving connections between said arms and said one shaft, there being a set of two for each arm.

2. In a structure of the class described, a pair of spaced parallel base members, pairs of uprights fastened to and rising from said base members and provided at their upper ends with bearings, horizontal shafts mounted for rotation in said bearings, sprockets carried by said shafts, a sprocket chain trained over said sprockets, connecting bars between the upper ends of said uprights, a pair of oppositely located pontoons disposed between a complemental pair of the uprights, single suspension arms for each pontoon rockably mounted on one of the shafts, pawl and ratchet driving connections between said arms and said one shaft, each driving connection comprising a pair of gears carried by said one shaft, and a set of separate pawls pivotally supported and cooperable with the teeth of the companion gear.

3. In a structure of the class described, an upright, a bearing fastened to the upper end of the upright, a shaft mounted for rotation in said bearing, plates mounted for rocking movement on said shaft on opposite sides of the bearing, an actuating arm for one of the plates, pawls pivotally mounted on said plates, gears rigidly fastened to said shaft on opposite sides of said bearing and in contact with said plates, said pawls being cooperable with the teeth of said gears, a head plate swivelly mounted on said bearing, and ball and socket joints between said first named plates and said head plate.

In testimony whereof I affix my signature.

WILLIAM ADAM BRYANT.